United States Patent
Kolman et al.

(10) Patent No.: US 9,130,985 B1
(45) Date of Patent: Sep. 8, 2015

(54) DATA DRIVEN DEVICE DETECTION

(71) Applicant: EMC Corporation, Hopkinton, MA (US)

(72) Inventors: Eyal Kolman, Tel Aviv (IL); Alon Kaufman, Bnei Dror (IL); Yael Villa, Tel Aviv (IL); Alex Vaystikh, Hod Hasharon (IL); Ereli Eran, Tel Aviv (IL); Eyal Yehowa Gruss, Tel Aviv (IL)

(73) Assignee: EMC Corporation, Hopkinton, MA (US)

( * ) Notice: Subject to any disclaimer, the term of this patent is extended or adjusted under 35 U.S.C. 154(b) by 38 days.

(21) Appl. No.: 13/931,830

(22) Filed: Jun. 29, 2013

(51) Int. Cl.
*G06F 7/00* (2006.01)
*H04L 29/06* (2006.01)
*G06F 17/30* (2006.01)
*G06N 5/02* (2006.01)

(52) U.S. Cl.
CPC .............. *H04L 63/1433* (2013.01); *G06F 7/00* (2013.01); *G06F 17/30* (2013.01); *G06N 5/02* (2013.01)

(58) Field of Classification Search
USPC ........................ 726/3; 707/748, 749, 752, 758
See application file for complete search history.

(56) References Cited

U.S. PATENT DOCUMENTS

| | | | |
|---|---|---|---|
| 8,484,225 B1 * | 7/2013 | Datta et al. ................. | 707/749 |
| 8,645,391 B1 * | 2/2014 | Wong et al. ................. | 707/748 |
| 2007/0192588 A1 * | 8/2007 | Roskind et al. ............. | 713/155 |

* cited by examiner

*Primary Examiner* — Brandon Hoffman
*Assistant Examiner* — Samuel Ambaye
(74) *Attorney, Agent, or Firm* — Ryan, Mason & Lewis, LLP

(57) ABSTRACT

Data driven device detection is provided, whereby a device is detected by obtaining a plurality of feature values for a given device; obtaining a set of device attributes for a plurality of potential devices; calculating a probability value that the given device is each potential device within the plurality of potential devices; identifying a candidate device associated with a maximum probability value among the calculated probability values; and labeling the given device as the candidate device if the associated maximum probability value satisfies a predefined threshold. The predefined threshold can be a function, for example, of whether the given user has previously used this device. The obtained feature values can be obtained for a selected set of features satisfying one or more predefined characteristic criteria. The device attributes can be obtained, for example, from a profile for each of the plurality of potential devices.

18 Claims, 3 Drawing Sheets

DATA DRIVEN DEVICE DETECTION

FIELD OF THE INVENTION

The present invention relates generally to techniques for device detection in network communication systems.

BACKGROUND OF THE INVENTION

Recognizing the device being used by an employee, consumer or another user is helpful in many applications. For example, recognizing the device can help the server to better present its content (e.g., different presentations suit mobile devices, tablets and desktop devices), provide better statistics on site traffic, and personalize the user-experience without having to identify the user.

In the security domain, such as Information Technology (IT) security systems and financial anti-fraud systems, device detection can serve as a powerful tool that aids in identifying the user and detecting impersonation attacks. In addition, device detection can serve as an additional valuable feature that makes risk assessment more accurate and with a reduced false positive rate. For example, an identity claim that is generated by a device that the user has never used before is more probable to be a fraudulent transaction, or an impersonation attack, especially when there are additional indicators that support this conclusion. On the other hand, reliable device detection can be used to increase usability by not asking the user for his or her credentials if the user is connecting from his or her regular device and several other features also have their expected value, e.g., the user's location, Internet Service Provider (ISP) and transaction time.

Existing adaptive authentication systems typically use device identification as part of a risk assessment process. Device detection is typically applied on the basis of the device features, such as installed applications, hardware characteristics and configuration values. Unfortunately, these features often change over time which makes device detection a challenging task.

A need therefore remains for improved device detection techniques.

SUMMARY OF THE INVENTION

The present invention in the illustrative embodiments described herein provides techniques for data driven device detection. In accordance with an aspect of the invention, device detection is performed by obtaining a plurality of feature values for a given device; obtaining a set of device attributes for a plurality of potential devices; calculating a probability value that the given device is each potential device within the plurality of potential devices; identifying a candidate device associated with a maximum probability value among the calculated probability values; and labeling the given device as the candidate device if the associated maximum probability value satisfies a predefined threshold. The predefined threshold can be a function, for example, of whether the given user has previously used this device. For example, the predefined threshold can have a lower value if the candidate device has been previously used by a user than if the candidate device has not been previously used by the user. In another variation, the predefined threshold can have a higher value if the candidate device has a number of substantially similar devices than if the candidate device does not have a number of substantially similar devices.

The obtained feature values can be obtained for a selected set of features satisfying one or more predefined characteristic criteria. The device attributes can be obtained, for example, from a profile for each of the plurality of potential devices.

The device detection can be performed, for example, as part of an authentication of a user, as part of a risk assessment of a user and/or to optimize a presentation of information to a user.

The device detection techniques of the illustrative embodiments overcome one or more of the problems associated with the conventional techniques described previously, and provide improved security by incorporating device detection based on data driven feature selection, probability-based estimation of the device and data driven threshold-based decisions. These and other features and advantages of the present invention will become more readily apparent from the accompanying drawings and the following detailed description.

DETAILED DESCRIPTION

The present invention provides techniques for data driven device detection, such as in an exemplary Adaptive Authentication (AA) system. According to one aspect of the invention, the disclosed techniques for data driven device detection employ data driven feature selection, probability-based estimation of the device and data driven threshold-based decisions. While the present invention is illustrated in the context of an exemplary Adaptive Authentication system, the present invention may be employed in any network communication system where device detection is desirable.

Figure 1:
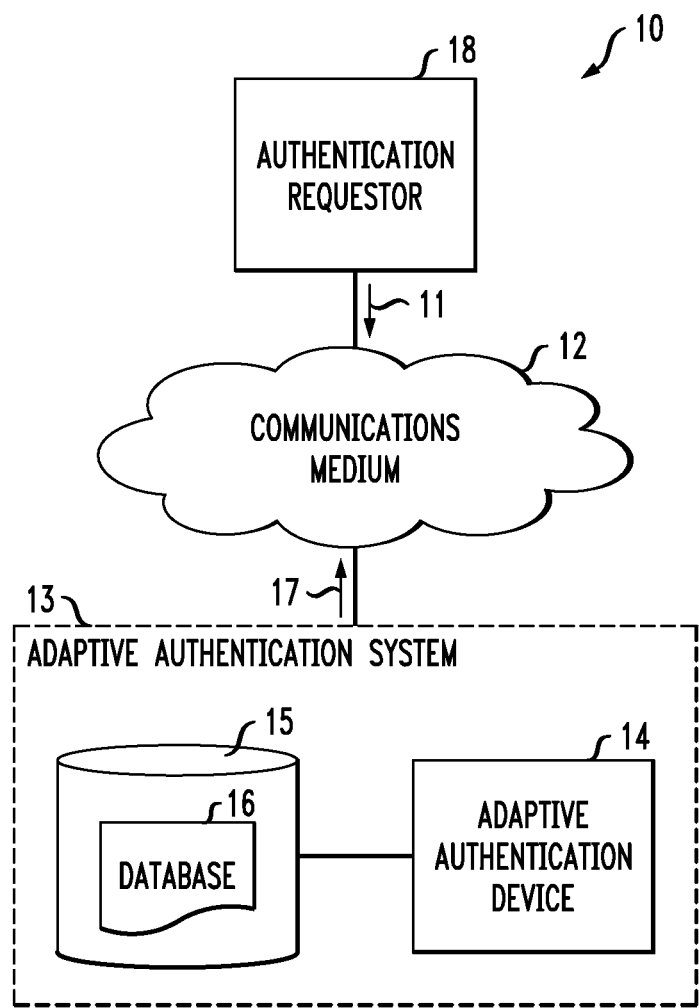
FIG. 1 is a schematic diagram illustrating an exemplary electronic environment in which the present invention can be implemented.

FIG. 1 illustrates an exemplary electronic environment 10 for carrying out the improved techniques. Electronic environment 10 includes communications medium 12, authentication requestor 18 and adaptive authentication system 13. As discussed further below, the adaptive authentication system 13 performs data driven device detection based on data driven feature selection, probability-based estimation of the device and data driven threshold-based decision.

Communications medium 12 provides connections between adaptive authentication system 13 and authentication requestor 18. The communications medium 12 may implement a variety of protocols such as TCP/IP, UDP, ATM, Ethernet, Fibre Channel, combinations thereof, and the like. Furthermore, the communications medium 12 may include various components (e.g., cables, switches/routers, gateways/bridges, NAS/SAN appliances/nodes, interfaces, etc.). Moreover, the communications medium 12 is capable of having a variety of topologies (e.g., queue manager-and-spoke, ring, backbone, multi-drop, point-to-point, irregular, combinations thereof, and so on).

Authentication requestor 18 is constructed and arranged to receive, from a user, requests to access data and send, to adaptive authentication system 13, request 11 to authenticate the user. Authentication requestor 18 is further constructed and arranged to receive an adaptive authentication result 17 which indicates whether the user is at high risk of being a fraudulent user.

Request 11 takes the form of a message that includes various facts and their values; such messages are embedded in a payload of a data packet. Request 11 typically includes a username for the user and a timestamp indicating a time.

Adaptive authentication system 13 is constructed and arranged to receive authentication request 11 from authentication requestor 18. Adaptive authentication system 13 is also constructed and arranged to generate adaptive authentication result 17 based on request 11 and a baseline profile of the user, the baseline profile including a history of requests from a user over several previous time windows. Adaptive authentication system 13 is further constructed and arranged to send adaptive authentication result 17 to authentication requestor 18. Adaptive authentication system 13 includes adaptive authentication device 14 and storage device 15.

Storage device 15 is constructed and arranged to store database 16 which contains current and baseline profiles for a user. Database 16 includes a set of entries, each entry of which includes a user identifier, a time period and user data.

Adaptive authentication device 14 is constructed and arranged to perform adaptive authentication operations on request 11 according to the improved techniques and takes the form of a desktop computer, laptop, server or tablet computer. Specifically, adaptive authentication device 14 receives request 11 from authentication requestor 18 and accesses the baseline profile having a user identifier matching the username of request 11. Further detail concerning adaptive authentication device 14 are described below with regard to FIG. 2.

Figure 2:
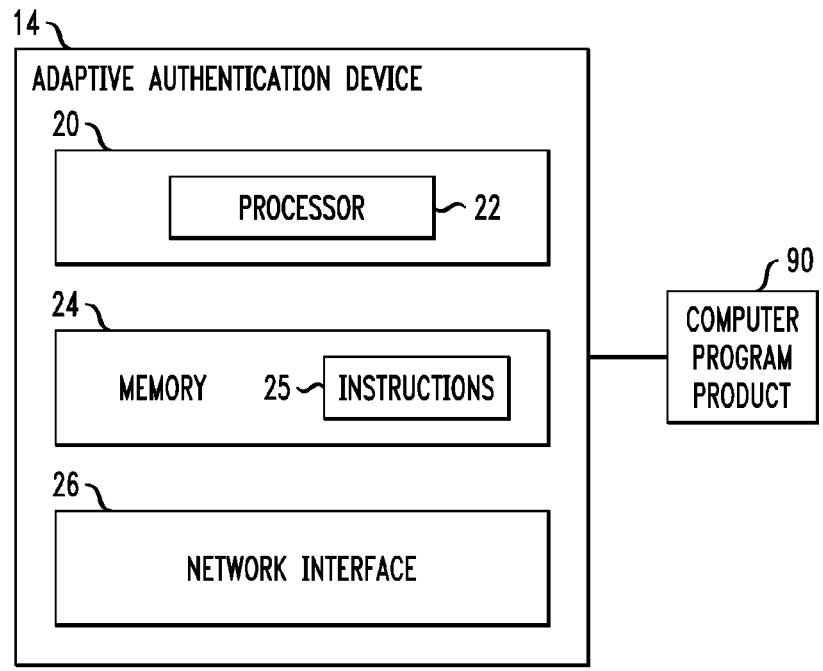
FIG. 2 is a schematic diagram illustrating an exemplary adaptive authentication device within the electronic environment shown in FIG. 1.

FIG. 2 illustrates components of adaptive authentication device 14. Adaptive authentication device 14 includes a controller 20 which in turn includes a processor 22, a memory 24 and a network interface 26.

Memory 24 is configured to store code which includes instructions 25 to process an authentication request from an authentication requestor. Memory 24 is further configured to store data from database 16 and request 11. Memory 24 generally takes the form of, e.g., random access memory, flash memory or a non-volatile memory.

Processor 22 can take the form of, but is not limited to, an Intel™ or AMD™-based microprocessor unit (MPU), and can be a single or multi-core running single or multiple threads. Processor 22 is coupled to memory 24 and is configured to execute the instructions 25 stored in memory 24.

Network interface 26 is constructed and arranged to send and receive data over communications medium 12. Specifically, network interface 26 is configured to receive request 11 from and to send adaptive authentication result 17 to authentication requestor 18.

Returning to FIG. 1, adaptive authentication result 17 indicates a likelihood that request 11 is associated with fraudulent activity. Processor 22 generates adaptive authentication result 17 based on fact values of request 11 and user data in database 16, as discussed further below in conjunction with FIGS. 3 through 5.

During operation, authentication requestor 18 sends request 11 to adaptive authentication device 14 via network interface 26. Processor 22 stores data such as the username, fact values and timestamp from request 11 in memory 24. Processor 22 accesses database 16 and performs a lookup operation on the username; that is, processor 22 compares the username to user identifiers in each entry of database 16 and chooses those entries having a user identifier which matches the username.

The lookup operation will result in several entries from database 16, each of whose user identifiers matches the username stored in memory 24 but has user data corresponding to a time interval. The time intervals of the entries of the database that have a user identifier that matches the username of request 11 are distinct and non-overlapping. For example, while one entry has a time interval which ends at the current time and begins at 12 AM the previous Sunday, another entry has a time interval which ends at 11:59 PM the previous Saturday and begins at 12 AM the Sunday prior, and so on.

Processor 22 optionally combines the fact values stored in memory 24 with the fact values in the entry of database 16 that corresponds to the current time interval. For a more detailed discussion of suitable Adaptive Authentication systems, see for example, U.S. patent application Ser. No. 13/246,937, filed Sep. 28, 2011, entitled "Using Baseline Profiles In Adaptive Authentication" and/or United States Patent Application entitled "Techniques for Authenticating Users of Massive Multiplayer Online Role Playing Games Using Adaptive Authentication," each incorporated by reference herein.

Data Driven Device Detection

As indicated above, aspects of the disclosed device detection techniques employ data driven feature selection, probability-based estimation of the device and data driven threshold-based decisions.

Data Driven Feature Selection

Figure 3:
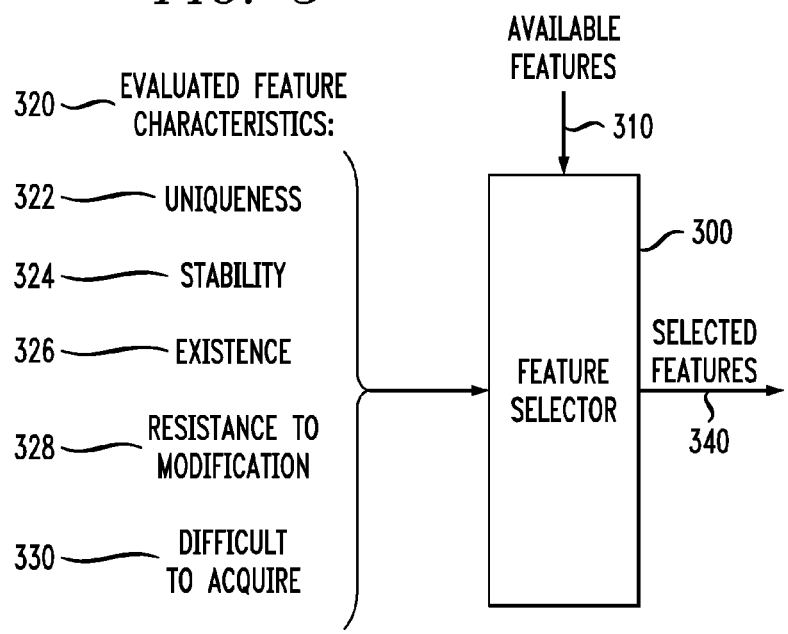
FIG. 3 illustrates an exemplary feature selector for evaluating a plurality of available features based on one or more exemplary characteristics to identify a selected set of features to evaluate.

FIG. 3 illustrates an exemplary feature selector 300 for evaluating a plurality of available features 310 based on one or more exemplary characteristics 320 to identify a selected set of features 340. Typically, the selected set of features 340 is predefined and fixed for a given device detection system.

In one exemplary embodiment, the exemplary feature selector 300 evaluates the plurality of available features 310 based on the following exemplary feature characteristics 320 to identify the selected set of features 340 to use for a given device detection system:

Uniqueness 322: The value of the feature is as unique as possible, when compared between different devices. For example, a MAC Address is considered unique since two devices will usually not have the same MAC Address.

Stability 324: The value of the feature should remain relatively constant over time. This will allow learning the device features values with high confidence that these values will be the same in the next occurrence of this device.

Existence 326: The feature should have value in most of the appearances of the device, so that the device detection module will be able to rely or infer from its' current existence.

Resistance to Modification 328: It should be difficult to change the value of the feature, so that we can assume that the attacker did not modify this value. For example, hostname is relatively easy to modify which renders it less trustable.

Difficult to Acquire 330: It should be difficult to mimic the feature values of a legitimate user. For example, learning the operating system of a regular user is relatively easy, while acquiring his or her specific MAC Address and copying MAC Addresses is much more difficult.

It is noted that the feature selector 300 function can be performed by a human, for example, employing enterprise best practices techniques. In further variations, the feature selector 300 can employ one or more of the following exemplary tools estimating the above characteristics 320: information-based tests, such as entropy measures and information gain, Kullback-Leibler (KL)-divergence for stability estimation, and wrapper-based models.

Probability-Based Device Estimation

As previously indicated, the values of the features of a specific device may change due to the dynamic environment, noise or parsing errors in the data monitoring systems, or due to missing data. Thus, different appearances of the same device may look different when performing an exact-match on its values. Instead of seeking exact matches, aspects of the present invention estimate the posterior probability of the device being $device_i$, given the device features and the profile of $device_i$, which may be expressed as follows:

$$P(device=device_i | feature_1=X_1, feature_2=X_2, \ldots, feature_n=X_n, profile(device_i)). \quad (1)$$

In other words, the probability that a device is $device_i$ depends on the session attributes (i.e., the feature values for the selected features 340 for the current session) and the device attributes (i.e., the historical device attributes recorded in the profile). The profile of $device_i$ records, for example, information collected about the device during prior sessions. Then, a given device is assigned to be $device_j$, where $$j = \underset{i}{\operatorname{argmax}} \{P(device_i | features, profile(device_i))\}. \quad (2)$$

Specifically, it can be assumed that the different features in the selected set of features 340 are statistically independent (e.g., the value of the MAC address does not influence the hostname, and vice versa). Hence, the overall posterior probability can be evaluated as a multiplication of the single probabilities, as follows:

$$P(device=device_i | feature_k=X_k, profile(device_i)). \quad (3)$$

This probability can be estimated by the stability of the device profile and the similarity of the feature value to the values in the device profile. Different similarity measures should be defined for the different features types. For example:

1. For a feature that has many instances in the device (e.g., each device usually has several MAC addresses) an intersection-based similarity measure should be applied, such as the Jaccard index.

2. For a feature with one instance and no internal meaning (e.g., hostname), an exact match should be used. This can be relaxed if errors in data may cause modifications of the feature value.

3. For a feature with one instance and some meaning (e.g., operating system), a pair-wise distance function can be defined. For example, an upgrade from WindowsXP to Windows7 is rare but explainable; whereas downgrading from Windows7 to WindowsXP or switching entirely to a different platform such as Mac OS X is much less probable and may indicate that this is a different device.

Data Driven Threshold-Based Decision

Once the maximal posterior dependent probability $P(device=device_i)$ is estimated in accordance with equations (1) or (3), a decision is made by comparing the probability value to a given threshold. If the determined probability value is higher than the predefined threshold, then the current device is indeed $device_i$.

According to a further aspect of the present invention, the predefined threshold can optionally be trained over real training data: a set of true and false samples can be generated by extracting per a specific sample of $device_i$ and a randomly chosen $device_j$, the posterior probabilities $P(device=device_i)$ and $P(device=device_j)$. The first value represents a true match and the latter value represents a false match. Then, a threshold can be set such that it maximizes some goodness criteria, e.g., accuracy, detection rate at a specific false alarm rate and/or minimal EER (Equal Error Rate). The threshold that gives the best results over the training set will be used in the online system. This threshold can be updated periodically to make sure that there are no significant deviations between the training set and test set.

Additionally, the system can optionally use two thresholds: If a device is currently used by user X, and that user often uses $device_i$, then the system is more inclined to decide that the current device is indeed $device_i$, which means using a lower threshold for the decision. On the other hand, if the user has never used $device_i$, then a stronger similarity is required to decide that $device_i$ is indeed a device of user X, which is expressed by using a higher threshold. In another variation, a higher threshold is employed when there are a number of similar devices.

Figure 4:
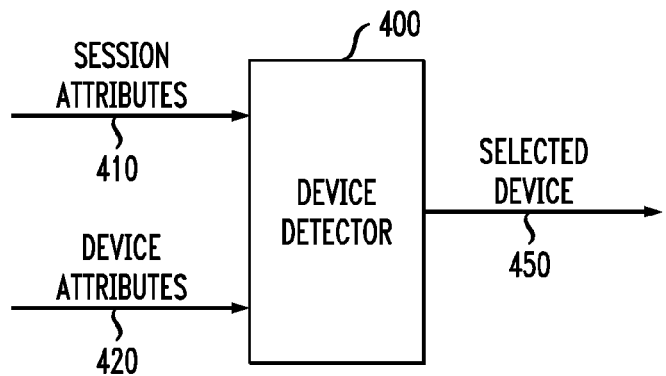
FIG. 4 illustrates an exemplary device detector incorporating aspects of the present invention.

FIG. 4 illustrates an exemplary device detector 400 incorporating aspects of the present invention. As shown in FIG. 4, the exemplary device detector 400 assigns a selected device label 450 to a given device based on session attributes 410 (i.e., the feature values for the selected features 340 for the current session) and the device attributes 420 (i.e., the historical device attributes recorded in the profile)

As discussed further below in conjunction with FIG. 5, the exemplary device detector 400 determines the probability that a device is $device_i$ based on the session attributes 410 and the device attributes 420 for all devices, selects the device with the maximum probability and then makes a device detection decision by comparing the determined maximum probability value to a predefined threshold. In one exemplary embodiment, the predefined threshold is a function of whether the given user has previously used this device.

Figure 5:
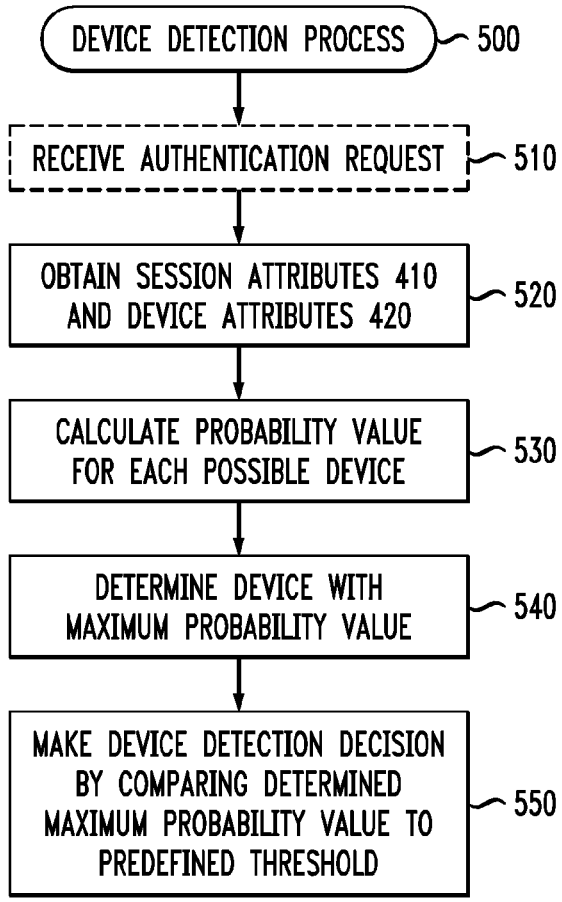
FIG. 5 is a flow chart describing an exemplary implementation of a device detection process that incorporates aspects of the present invention.

FIG. 5 is a flow chart describing an exemplary implementation of a device detection process 500 that incorporates aspects of the present invention. As shown in FIG. 5, in an exemplary adaptive authentication setting, the exemplary device detection process 500 initially receives an authentication request during step 510 from the authentication requestor 18. The device detection process 500 then obtains the session attributes 410 and device attributes 420 for each possible device during step 520 and calculates the probability value for each possible device during step 530.

The exemplary device detection process 500 determines the device with the maximum probability value during step 540, and makes a device detection decision during step 550 by comparing the determined maximum probability value to a predefined threshold. As indicated above, in one exemplary embodiment, the predefined threshold is a function of whether the given user has previously used this device. If a device is currently used by user X, and that user often uses $device_i$, then the system is more inclined to decide that the current device is indeed $device_i$, which means using a lower threshold for the decision. On the other hand, if the user has never used $device_i$, then a stronger similarity is required to decide that $device_i$ is indeed a device of user X, which is expressed by using a higher threshold.

Additionally, the adaptive authentication server 14 optionally updates its records in the user database 16 with data gathered during the user login attempt. Such information may include identification information of a new user device, a new location, a new access time, etc. Generally, the answer to the challenge is typically applied to an adapting algorithm and the classifier can be modified using supervised learning techniques to fit the new information.

Among other benefits, the disclosed device detection techniques generate and update device profiles via a probabilistic-based comparison. In addition, the disclosed device detection techniques are robust and adaptive and can handle modifications, configuration changes and noisy or missing data. Additionally, disclosed device detection techniques employ data that is currently being monitored by many SIEM systems, so no additional deployment of hardware or software is required.

While various embodiments of the invention have been particularly shown and described, it will be understood by those skilled in the art that various changes in form and details may be made therein without departing from the spirit and scope of the invention as defined by the appended claims.

Furthermore, it should be understood that some embodiments are directed to device detection within an adaptive authentication device 14 which identifies particular events for alerting within an event notification management system. Some embodiments are directed to adaptive authentication device 14 that performs device detection. Some embodiments are directed to a system that processes an authentication request from an authentication requestor that includes a device detection in accordance with the present invention. Some embodiments are directed to a method for device detection. Also, some embodiments are directed to a computer program product that enables computer logic to perform device detection.

In some arrangements, adaptive authentication device 14 is implemented by a set of processors or other types of control/processing circuitry running software. In such arrangements, the software instructions can be delivered to adaptive authentication device 14 in the form of a computer program product (illustrated generally by code for computer program 90 stored within memory 24 in FIG. 2) having a computer readable storage medium which stores the instructions in a non-volatile manner. Alternative examples of suitable computer readable storage media include tangible articles of manufacture and apparatus such as CD-ROM, flash memory, disk memory, tape memory, and the like.

As mentioned previously herein, the above-described embodiments of the invention are presented by way of illustrative example only. Numerous variations and other alternative embodiments may be used.

The term "authentication information" as used herein is intended to include passwords, passcodes, answers to life questions, or other authentication credentials, or values derived from such authentication credentials, or more generally any other information that a user may be required to submit in order to obtain access to an access-controlled application. Although the illustrative embodiments are described herein in the context of adaptive authentication, it is to be appreciated that the invention is more broadly applicable to any other type of network communication system.

The illustrative embodiments of the invention as described herein provide improved device detection techniques. Advantageously, the illustrative embodiments do not require changes to existing communication protocols. It is therefore transparent to both existing applications and communication protocols. The described techniques may be used with security tokens that generate one-time passwords or other types of authentication information, regardless of whether such tokens are connectable to the user device.

It should again be emphasized that the particular device detection techniques described above are provided by way of illustration and should not be construed as limiting the present invention to any specific embodiment or group of embodiments. Also, the particular configuration of system elements shown in the figures and their interactions may be varied in other embodiments. Moreover, the various simplifying assumptions made above in the course of describing the illustrative embodiments should also be viewed as exemplary rather than as requirements or limitations of the invention. Numerous alternative embodiments within the scope of the appended claims will be readily apparent to those skilled in the art.

What is claimed is:

1. A method for device detection, the method comprising: obtaining a plurality of feature values for a given device; obtaining a set of device attributes for a plurality of potential devices; calculating a probability value that the given device is each potential device within said plurality of potential device based on said plurality of feature values for said given device and one or more device attributes for said given device; identifying a candidate device associated with a maximum probability value among said calculated probability values; and labeling said given device as said candidate device if said associated maximum probability value satisfies a predefined threshold.

2. The method of claim 1, wherein said predefined threshold is a function of whether the given user has previously used this device.

3. The method of claim 2, wherein said predefined threshold has a lower value if said candidate device has been previously used by the given user than if said candidate device has not been previously used by the given user.

4. The method of claim 1, wherein said predefined threshold has a higher value if said candidate device has a number of substantially similar devices than if said candidate device does not have a number of substantially similar devices.

5. The method of claim 1, wherein said obtained plurality of feature values are obtained for a selected set of features satisfying one or more predefined characteristic criteria.

6. The method of claim 1, wherein said device attributes are obtained from a profile for each of said plurality of potential devices.

7. The method of claim 1, wherein said method is performed as part of one or more of an authentication of a user and a risk assessment of a user.

8. A computer program product comprising a non-transitory machine-readable storage medium having encoded therein executable code of one or more software programs, wherein the one or more software programs when executed perform the steps of the method of claim 1.

9. An apparatus for device detection, the apparatus comprising: a memory; and at least one hardware device, coupled to the memory, operative to: obtain a plurality of feature values for a given device; obtaining a set of device attributes for a plurality of potential devices; calculate a probability value that the given device is each potential device within said plurality of potential devices based on said plurality of feature values for said given device and one or more device attributes for said given device; identify a candidate device associated with a maximum probability value among said calculated probability values; and labeling said given device as said candidate device if said associated maximum probability value satisfies a predefined threshold.

10. The apparatus of claim 9, wherein said predefined threshold is a function of whether the given user has previously used this device.

11. The apparatus of claim 10, wherein said predefined threshold has a lower value if said candidate device has been previously used by the given user than if said candidate device has not been previously used by the given user.

12. The apparatus of claim 9, wherein said predefined threshold has a higher value if said candidate device has a number of substantially similar devices than if said candidate device does not have a number of substantially similar devices.

13. The apparatus of claim 9 wherein said obtained plurality of feature values are obtained for a selected set of features satisfying one or more predefined characteristic criteria.

14. The apparatus of claim 9, wherein said device attributes are obtained from a profile for each of said plurality of potential devices.

15. The apparatus of claim 9, wherein said apparatus is employed during one or more of an authentication of a user and a risk assessment of a user.

16. The method of claim 1, wherein said probability value can be estimated based on a similarity of a given feature value from among said plurality of feature values to feature values in a device profile.

17. The method of claim 16, wherein said similarity of said given feature value is based on one or more of an intersection-based similarity measure for a feature that has multiple instances among said plurality of potential devices; an exact match similarity for a feature with one instance among said plurality of potential devices and no internal meaning; and a pair-wise distance function for a feature with one instance among said plurality of potential devices and at least some meaning.

18. The apparatus of claim 9, wherein said probability value can be estimated based on a similarity of a given feature value from among said plurality of feature values to feature values in a device profile, and wherein said similarity of said given feature value is based on one or more of an intersection-based similarity measure for a feature that has multiple instances among said plurality of potential devices; an exact match similarity for a feature with one instance among said plurality of potential devices and no internal meaning; and a pair-wise distance function for a feature with one instance among said plurality of potential devices and at least some meaning.

* * * * *